(12) United States Patent
Brawer

(10) Patent No.: US 10,416,712 B2
(45) Date of Patent: Sep. 17, 2019

(54) DEVICES AND METHODS FOR PORTABLE PROCESSING AND APPLICATION EXECUTION

(71) Applicant: USquare Soft Inc., Toronto (CA)

(72) Inventor: Edward Brawer, Toronto (CA)

(73) Assignee: USquare Soft Inc., Don Mills, Ontario ( * ) Notice: Subject to any disclaimer, the term of this patent is extended or adjusted under 35 U.S.C. 154(b) by 125 days.

(21) Appl. No.: 14/608,272

(22) Filed: Jan. 29, 2015

(65) Prior Publication Data

US 2015/0220110 A1 Aug. 6, 2015

(30) Foreign Application Priority Data

Jan. 31, 2014 (CA) ...................................... 2841371

(51) Int. Cl.
*G06F 1/16* (2006.01)
*G06F 3/14* (2006.01)
(Continued)

(52) U.S. Cl.
CPC .............. *G06F 1/163* (2013.01); *G04G 11/00* (2013.01); *G04G 21/00* (2013.01); *G04G 21/04* (2013.01);
(Continued)

(58) Field of Classification Search
CPC .......... H04W 4/008; G06F 1/163; G06F 3/14; G06F 3/1454; G04G 21/04
See application file for complete search history.

(56) References Cited

U.S. PATENT DOCUMENTS

| 6,982,702 B1* | 1/2006 | Frame ................... G06F 1/1616 248/917 |
| 7,081,905 B1* | 7/2006 | Raghunath ............... G04G 5/00 345/684 |

(Continued)

FOREIGN PATENT DOCUMENTS

| CN | 102315864 A | 1/2012 |
| CN | 203027303 U | 6/2013 |

(Continued)

OTHER PUBLICATIONS

International Search Report and Written Opinion relating to Application No. PCT/CA2015/050057, dated May 4, 2015.

(Continued)

*Primary Examiner* — Binh B Tran
*Assistant Examiner* — Douglas R Burtner
(74) *Attorney, Agent, or Firm* — Rowand LLP

(57) ABSTRACT

A portable computing device, such as a wristwatch, is described. The portable computing device contains ample processing, battery and memory resources for executing applications, but provides insufficient display output capability to render a graphical user interface during application execution. Instead, the device includes a short-range wireless communication system for relaying real-time display data to an external display device for rendering a graphical user interface on the external device. By not incorporating power-hungry display technology, speakers, other communication components, such as cellular, or other battery-draining components, the portable computing device avoids the need for bulky batteries and maintains a suitable charge over a reasonable period of time. In addition, the easy portability of the device means that it can turn any external display device into its own user input/output device such (Continued)

that users need not mirror their applications and data to multiple devices.

19 Claims, 9 Drawing Sheets

(51) Int. Cl.
| | | |
|---|---|---|
| *G04G 21/04* | (2013.01) | |
| *G06F 3/147* | (2006.01) | |
| *G04G 11/00* | (2006.01) | |
| *G04G 21/00* | (2010.01) | |
| *H04N 21/41* | (2011.01) | |

(52) U.S. Cl.
CPC ............ *G06F 1/165* (2013.01); *G06F 1/1633* (2013.01); *G06F 3/14* (2013.01); *G06F 3/147* (2013.01); *G06F 3/1454* (2013.01); *G09G 2320/0252* (2013.01); *G09G 2354/00* (2013.01); *G09G 2370/12* (2013.01); *G09G 2370/16* (2013.01); *G09G 2380/02* (2013.01); *H04N 21/4122* (2013.01)

(56) References Cited

U.S. PATENT DOCUMENTS

| | | | | |
|---|---|---|---|---|
| 7,441,415 | B2* | 10/2008 | Radley-Smith | A44C 5/0015 345/46 |
| 7,814,332 | B2* | 10/2010 | Beenau | G06K 9/00885 380/227 |
| 8,387,088 | B2* | 2/2013 | Roberts | H04N 7/17318 725/37 |
| 8,869,263 | B2* | 10/2014 | Pasquero | H04B 5/00 380/247 |
| 9,239,628 | B2* | 1/2016 | Wolff-Petersen | G06F 3/04895 |
| 9,274,507 | B2* | 3/2016 | Kim | G04G 21/02 |
| 9,288,836 | B1* | 3/2016 | Clement | H04W 84/18 |
| 9,317,155 | B2* | 4/2016 | Magi | G06F 1/1652 |
| 9,317,240 | B2* | 4/2016 | Lee | G06F 9/452 |
| 2003/0046228 | A1* | 3/2003 | Berney | G06F 21/32 705/41 |
| 2005/0174302 | A1* | 8/2005 | Ishii | G06F 3/1423 345/30 |
| 2006/0258289 | A1* | 11/2006 | Dua | H04M 1/7253 455/41.3 |
| 2007/0083660 | A1* | 4/2007 | Thornton | H04L 67/2814 709/201 |
| 2011/0066971 | A1* | 3/2011 | Forutanpour | G06F 9/451 715/788 |
| 2012/0077586 | A1* | 3/2012 | Pishevar | A63F 13/06 463/31 |
| 2012/0229270 | A1 | 9/2012 | Morley et al. | |
| 2012/0238246 | A1 | 9/2012 | Rekimoto et al. | |
| 2012/0317024 | A1* | 12/2012 | Rahman | G01K 13/002 705/42 |
| 2013/0127980 | A1* | 5/2013 | Haddick | G06F 3/013 348/14.08 |
| 2013/0196765 | A1* | 8/2013 | Wolff-Petersen | G06F 3/04895 463/36 |
| 2013/0303213 | A1 | 11/2013 | Kennard | |
| 2013/0339409 | A1* | 12/2013 | Kallio | A61B 5/02055 708/100 |
| 2014/0028688 | A1* | 1/2014 | Houjou | G09G 5/006 345/520 |
| 2014/0068494 | A1* | 3/2014 | Petersen | H04M 1/7253 715/778 |
| 2014/0168063 | A1* | 6/2014 | Kita | G06F 3/017 345/156 |
| 2014/0313414 | A1* | 10/2014 | Wu | H04N 21/4312 348/552 |
| 2015/0002411 | A1* | 1/2015 | Hwang | G06F 3/0416 345/173 |
| 2015/0009096 | A1* | 1/2015 | Lee | G06F 1/163 345/2.2 |
| 2015/0027934 | A1 | 1/2015 | Johnston et al. | |
| 2015/0186092 | A1* | 7/2015 | Francis | G06F 3/1423 345/520 |
| 2015/0254367 | A1* | 9/2015 | Kagan | G06F 16/248 707/706 |
| 2015/0256593 | A1* | 9/2015 | Kelani | H04L 67/025 715/740 |
| 2016/0147499 | A1* | 5/2016 | Ryu | G06F 3/1454 715/748 |
| 2016/0188681 | A1* | 6/2016 | Savliwala | G06F 16/248 707/722 |
| 2016/0226945 | A1* | 8/2016 | Granqvist | G06F 19/3418 |
| 2017/0140174 | A1* | 5/2017 | Lacey | G06F 21/6245 |
| 2017/0173470 | A1* | 6/2017 | Wolff-Petersen | G06F 3/04895 |
| 2017/0185589 | A1* | 6/2017 | Neff | G06Q 10/10 |
| 2017/0238060 | A1* | 8/2017 | Roberts | H04N 21/4788 725/38 |

FOREIGN PATENT DOCUMENTS

| | | |
|---|---|---|
| EP | 0936808 A1 | 8/1999 |
| JP | 2013504826 | 2/2013 |

OTHER PUBLICATIONS

Stein: "Martian Passport Watch review: Hello, this is your wristwatch calling", available at http://www.cnet.com/products/martian-passport-watch/, Feb. 28, 2013.
Pitzer et al.: "The next Big Thing—Wearables Are in Fashion", Equity Research, Credit Suisse, May 17, 2013.
EPO, Partial European Search Report relating to Application No. 15152930.2, dated Jun. 2, 2015.
Chinese State Intellectual Property Office (SIPO), Office Action relating to application No. 201580003688.1 dated Sep. 28, 2018.
Japanese Patent Office (JPO), Notice of Reasons for Rejection, dated Oct. 30, 2018, relating to JP application No. 2016-567107.

* cited by examiner

DEVICES AND METHODS FOR PORTABLE PROCESSING AND APPLICATION EXECUTION

CROSS-REFERENCE TO RELATED APPLICATIONS

The present application claims priority to Canadian patent application serial no. 2,841,371 filed Jan. 31, 2014, the contents of which are hereby incorporated by reference.

FIELD

The present disclosure generally relates to wearable computing and, in particular, to a portable device with processing and memory resources but with limited display capabilities.

BACKGROUND

Mobile device developments have resulted in widespread proliferation of smartphones, tablets, laptops, and other such computing devices. Each device includes high resolution display technology, user input features, multiple sensors, and a plurality of radios and RF communication technology. This renders the devices complex and expensive, and means that they require large frequently-recharged batteries to remain powered.

In addition to these technologies, there has been recent interest in "wearable computing", such as Google Glass™ and so-called "smart-watches". The smart-watches being developed tend to be smartphones shrunk into as small a form factor as is possible such that they can be strapped to a user's wrist. This can result in a poor user experience since the display screen for viewing and interacting with applications is necessarily very small.

With the excessive number of devices available, each having their own processors, displays, memories, etc., users must take steps to mirror their applications and data on each device. Many services have been developed to "sync" devices such that applications, data, and media are duplicated across all of a user's various devices. This can present a technical challenge to users and security problems as data is synced across various networks.

BRIEF DESCRIPTION OF THE DRAWINGS

Reference will now be made, by way of example, to the accompanying drawings which show example embodiments of the present disclosure, and in which.

Similar reference numerals may have been used in different figures to denote similar components.

DESCRIPTION OF EXAMPLE EMBODIMENTS

Figure 1:
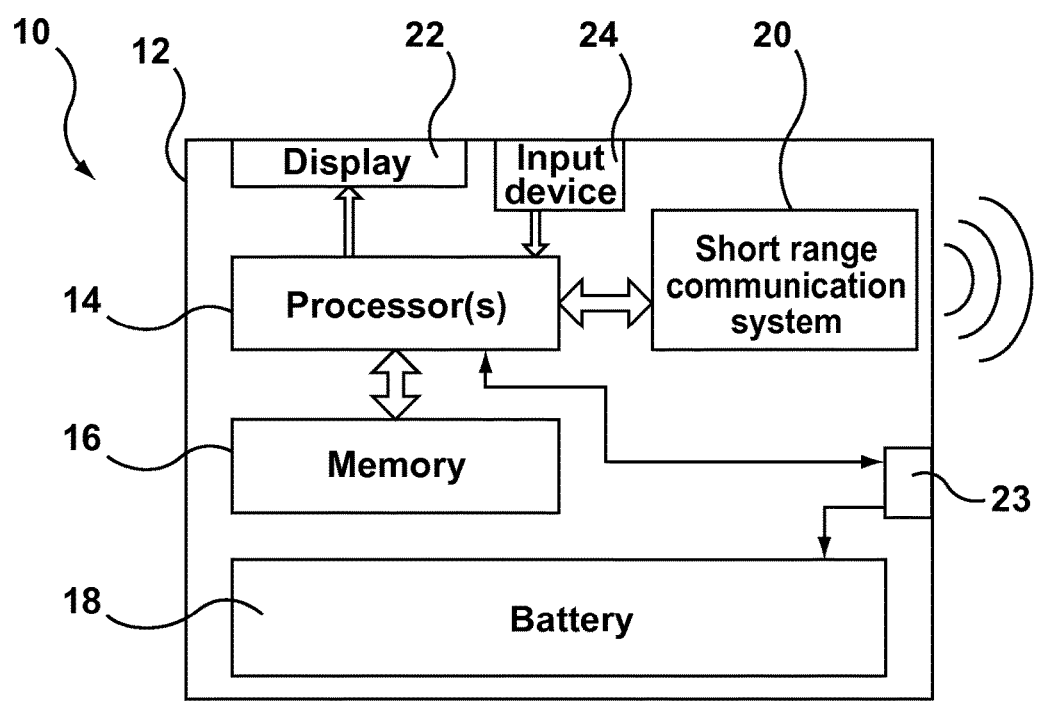
FIG. 1 shows, in block diagram form, an example of a portable computing device.

The present disclosure describes a portable computing device. In many embodiments the portable computing device is a wearable computing device and, in many such embodiments, the wearable computing device is a wristwatch. The portable computing device contains a processor, memory, and a short-range wireless communication system. The device does not include a user interface, such as a display screen, sufficient to render detailed graphical user interfaces generated by applications executed by the processor on the device. Accordingly, the portable device connects wirelessly to a nearby external device with a display and uses the external device for displaying the applications' graphical user interfaces and receiving user input. By leveraging the input/output capabilities of an external or peripheral device over a wireless link, the portable device is able to focus its limited power resources on memory and processing and does not waste power on driving a detailed display or complex user input and sensor technology.

In a first aspect, the present disclosure describes a wristwatch to wirelessly connect to an external display device to view applications executed by the wristwatch. The wristwatch includes a wearable casing having a face plate with a time display. Within the wearable casing, the wristwatch includes a processor, memory storing the application to be executed by the processor, the application to generate display data for rendering a graphical user interface, a battery, an output interface insufficient for displaying the graphical user interface during execution of the application, and a short-range communication system to connect wirelessly to the external display device and transmit the display data from the processor to the external display device for rendering of the graphical user interface on the external display device.

In another aspect, the present disclosure describes a method that includes receiving, on a portable computing device, a user input indicating a request to initiate pairing and, in response, enabling a short-range communication system within the portable computing device, the portable computing device including a processor and memory storing at least one application to be executed by the processor, the application to generate display data for rendering a graphical user interface, and wherein the portable computing device includes an output interface insufficient for displaying the graphical user interface during execution of the application. The method further includes receiving, via the short-range communication system, a pairing request from an external display device; determining that a pairing acceptance input is received through a user input device on the portable computing device in response to the pairing request; and, based on the determination that the pairing acceptance input was received, pairing the portable computing device with the external display device and establishing a wireless connection for sending the display data from the processor to the external display device for rendering of the graphical user interface on the external display device during execution of the application.

In yet a further aspect, the present disclosure describes non-transitory computer-readable media storing computer-executable program instructions which, when executed, configured one or more processors to perform the described methods.

Other aspects and features of the present disclosure will be understood by those of ordinary skill in the art from a review of the following description of examples in conjunction with the accompanying figures.

In accordance with one aspect of the present application, a portable computing device is described which is configured to minimize power and resources consumed by input/output devices, such as a display, multiple wireless or wired communications modules, and user input devices. The portable computing device is adapted to provide full data storage and processing and application execution capabilities, while relying upon external devices for input and output. Short-range wireless connectivity may be enabled through the incorporation of a short-range communications module within the portable computing device. The short-range communications module may include a WiFi module. The wireless short-range communications link should have significant speed and bandwidth to accommodate low-latency transfer of input/output data with external devices. The link may be short-range to minimize power consumption and for security purposes. A minimal display capability may be incorporated to signal simple data to a user, such as for the purposes of pairing with external peripheral devices. The portable computing device may be a wearable device in many embodiments, such as a wristwatch.

Reference is now made to FIG. 1, which shows, in block diagram form, one example of a portable computing device 10. The portable computing device 10 may be a wearable computing device 10, such as a pendant, wristwatch, or the like. The portable computing device 10 includes a housing 12, which may be plastic, metal, or combinations thereof.

Within the housing 12, the portable computing device 10 includes one or more processors 14, which may include a multi-core processor, a single-core processor, or other configurations. In examples below, the one or more processors 14 may be referred to as the processor 14, but it will be appreciated that embodiments may include one or more processors.

The portable computing device 10 includes a memory 16 coupled to the processor 14. The memory 16 may include both volatile and non-volatile memory elements. The memory 16 may store program instruction for execution by the processor 14, including an operating system, applications, diagnostic modules, etc. The memory 16 may also store data, including user data, application data, communications-specific data, etc. Some or all of the memory 16 may be encrypted.

The portable computing device 10 may further include a battery 18. The battery 18 may be rechargeable. In some instances, the portable computing device 10 includes a charging port 23 for receiving a power signal for charging the battery 18. In some embodiments, the charging port 23 may also provide a wired connection for communication between the portable computing device 10 and an external device like a personal computer. The charging port 23 may be a microUSB port, for example. In some cases, the charging port 23 may be an HDMI port, or similar. In some cases, the charging port 23 may be a non-standard proprietary port. When a wired connection is present via the charging port 23 to an external device, the processor 14 may be configured to use the wired connection in place of a wireless connection to save battery power and to improve speed and reduce any latency issues when exchanging data with the external device. This behavior may be default behavior and/or may be user-configurable.

The portable computing device 10 also includes a short-range communication system 20. The short-range communication system 20 facilitates wireless connectivity between the portable computing device 10 and one or more other devices. In one example embodiment, the short-range communication system 20 comprises a wireless local area network module, such as a WiFi chip conforming to one or more of the IEEE 802.11 communication standards.

The portable computing device 10 may further include a display 22. The display 22 may include a touch-sensitive input overlay for receiving touch gesture data. In many embodiments, the display 22 may be limited to one or more LED lights, a small LED display surface, or one or more small LCD or LED-based icons in-laid within the face or another surface the portable computing device 10. Examples will be described further below.

In many embodiments, the display 22 is not a full LCD or LED screen, such as may be found on a smartphone, tablet, or laptop; and, in many embodiments, the display is not an e-Ink display as may be found on an e-reader. The surface area of the display may be significantly limited, and may in some cases simply feature one or more individual LED lights. In one embodiment, the display 22 is a single colour.

The display 22 is simple and small to preserve battery power. On a smartphone, tablet, or laptop, the display consumes a large quantity of power. Because the portable computing device 10 relies upon the display screen of another device to which it is wirelessly connected, it does not necessarily feature a full display screen of its own. Instead, to maximize the available battery power for communications and processing, the portable computing device 10 has very limited or no display capabilities. The display capabilities of the portable computing device 10 are insufficient to render a graphical user interface generated by an application executed on the portable computer device 10. The graphical user interface may include display of multi-media data, including video, images, icons, text, or other graphical data. In some examples, the graphical user interface includes a video player, a photo browser, a web browser, a word processor, a spreadsheet, or a game interface.

In addition to relying upon external devices (which may be referred to herein as peripheral devices) for display capabilities, the portable computing device 10 may further rely upon wirelessly receiving user input from external devices, including input such as keystrokes, touchscreen gestures, mouse input, or other user navigation and data input signals. Other input received wirelessly, instead of through native input devices in the portable computing device 10, may include image, video and/or audio input (e.g. from a camera and/or microphone). Accordingly, the portable computing device 10 may feature only a limited input device 24. In some embodiments, the input device 24 may comprise a touch-sensitive surface. In some embodiments, the input device 24 may comprises one or more buttons, keys, or switches. In some embodiments, the input device 24 may comprise a single button. Examples will be given below.

It will be appreciated that the portable computing device 10 is primarily a data storage and computing device. The short-range communication system 20 enables connection of the device 10 with external devices that have the power-hungry and/or physically large input/output features excluded from the portable computing device 10. For example, external devices that may be used in conjunction with the portable computing device 10 may include those with relatively large display screens (televisions, monitors, tablets, smartphones, laptop computers, desktop computers, etc.). Another feature of an external device that the portable computing device 10 may wish to leverage is more advanced user input capabilities, including touch-sensitive input (e.g. a touchscreen), a keypad, a keyboard, camera, microphone, or other input or navigational user interfaces.

In order to allow for real-time display of data, including run-time display data from an application being executed on the processor 14, the short-range communication system 20 provides a relatively high-bandwidth short-range connection to an external device. In some cases, this short-range connection is over WiFi, although other short-range technologies may be used in some implementations. Bluetooth™ may be used in some implementations, although its bandwidth may be too low for many embodiments. In some cases WiFi Direct™ may be used. In general, the short-range communication system 20 should provide a high-bandwidth, low-latency connection to the external device(s) for optimal usability.

In many embodiments, the portable computing device 10 has a physically compact form factor, so as to enable easy portability. To make the device 10 wearable, it may be lightweight and small. By excluding large display screens, and long-range RF components, significant battery resources that would otherwise be consumed by these elements are not needed, or may be redirected to processing and short-range communication functions. This may enable reduction in the size of the battery that would otherwise be used in, for example, a smartphone. The portable computing device 10 may, in many embodiments, be sufficiently small to be worn as a wristwatch or to be incorporated into a wristwatch.

Figure 2:
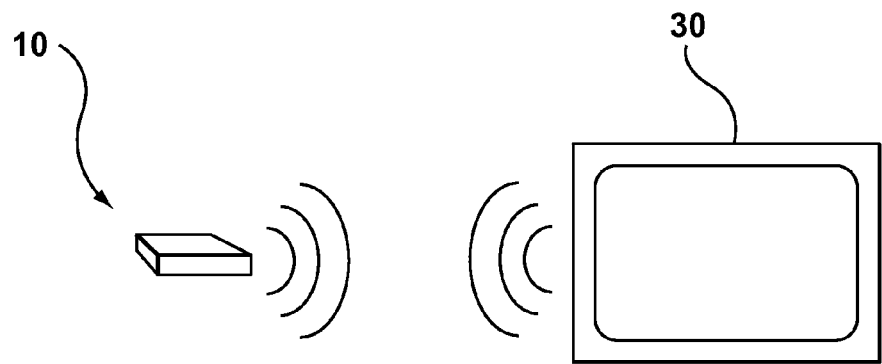
FIGS. 2 through 6 show various example usage scenarios involving the portable computing device.

Reference is now made to FIG. 2, which shows a first example usage scenario involving the portable computing device 10. In this example, the portable computing device 10 is paired with, and communicating wirelessly with, a display device 30. The display device 30 may include a tablet, a wireless-capable television, a laptop, a smartphone, or other such devices. The display device 30 and the portable computing device 10 communicate over a short-range wireless connection. In one embodiment, the connection is a WiFi Direct connection in which the portable computing device 10 acts as a software access point to establish a WiFi connection with the display device 30. In another embodiment, the connection is a WiFi Direct connection in which the display device 30 acts as a software access point to establish the WiFi connection with the portable computing device 10. As noted above, short-range communication protocols other than WiFi may be used in some embodiments.

The display device 30 may, in some embodiments, include a processor capable of executing application programs and other software. Nonetheless, the portable computing device 10 uses its own processing capabilities as the run-time environment for application execution and relays display data over the wireless connection to the display device 30 for rendering of the application's graphical user interface on the display screen of the display device 30. User input data received by the display device 30 through its touchscreen, keyboard, keypad, navigation buttons, etc., is relayed to the portable computing device 10 for input to the processor 14 (FIG. 1). In this sense, the display device 30 is used by the portable computing device 10 as one or more wireless peripheral devices for display output and receipt of user input.

Figure 3:
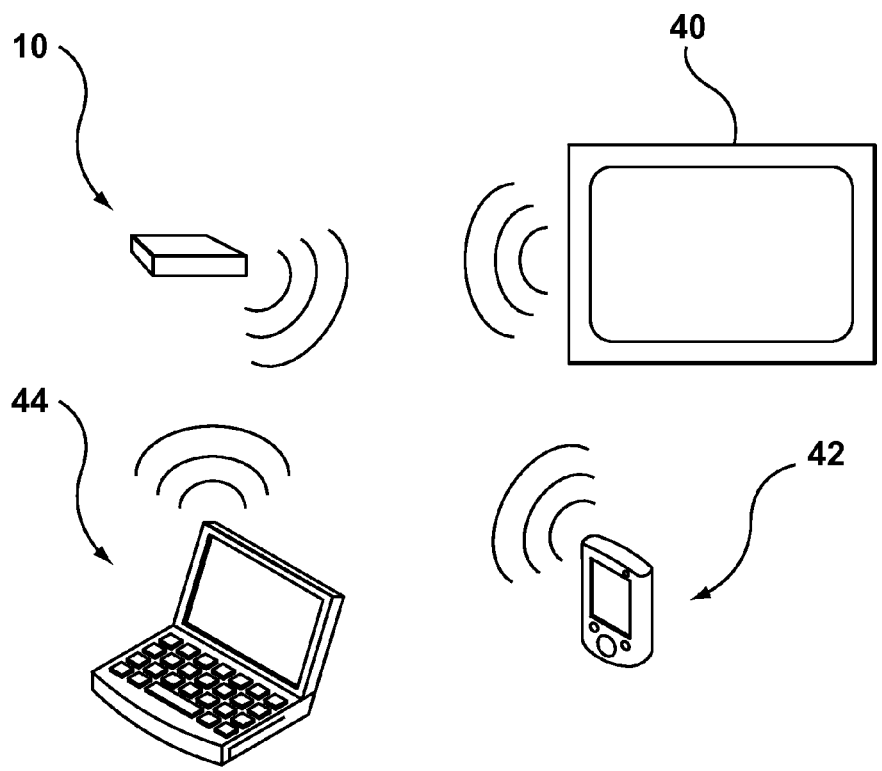

FIG. 3 illustrates another example usage scenario in which the portable computing device 10 is wirelessly connected to a plurality of devices, including a tablet 40, a smartphone 42, and a laptop 44. The portable computing device 10 may connect to the various devices using WiFi Direct in some embodiments. In some instances, one or more of the devices, such as the tablet 40 and/or the laptop 44 may receive display data from the portable computing device 10 for display on their respective display screens. In some instances, a different device, such as the smartphone 42, and/or the tablet 40 or laptop 44, may be used to receive user input and navigation commands that are relayed wirelessly to the portable computing device 10.

Figure 4:
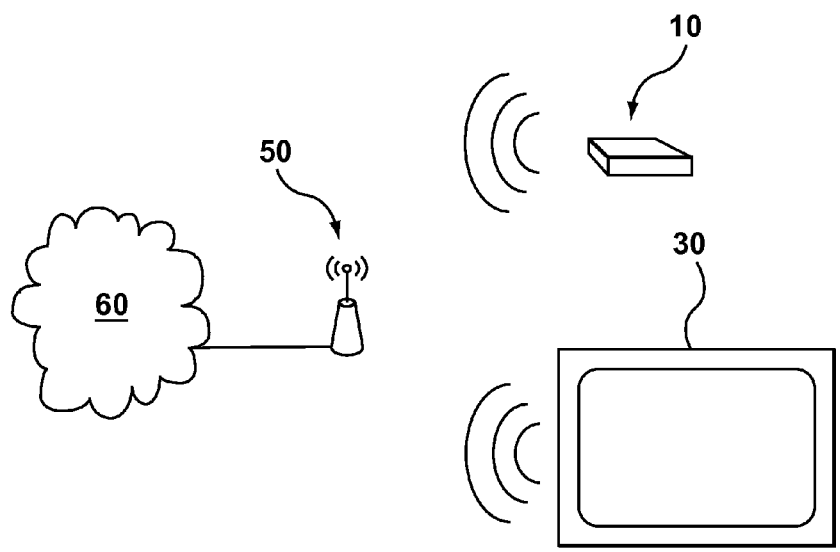

FIG. 4 shows a further example usage scenario in which the portable computing device 10 and the display device 30 both connect to an access point 50, such as a WiFi wireless router. The access point 50 may have a wireless or wired connection to a public network, such as the Internet 60 to allow the portable computing device 10 to access to remote servers and/or sites.

Figure 5:
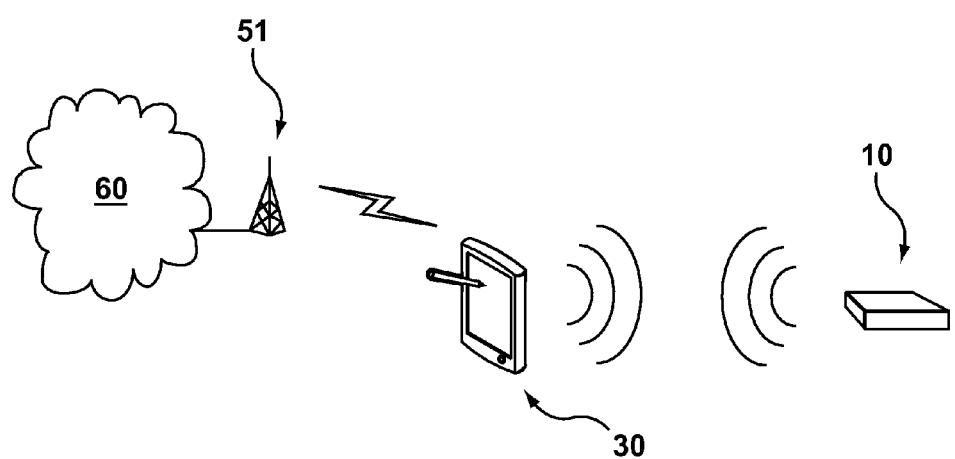

FIG. 5 illustrates yet a further example usage scenario in which the display device 30 and the portable computing device 10 are connected wirelessly using, for example, WiFi Direct. Either of those two devices may implement the software access point to enable WiFi Direct in some embodiments. The display device 30 in this example contains radio technology for establishing a wide area wireless connection to a public network, like the Internet 60, via a mobile cellular network 51, for example. The wide area wireless connection may include a data connection using, for example, HSPA+, LTE, WiMax, or other mobile data access technologies. It will be appreciated that the "public network" in example scenarios may include routing communications through mobile network operator systems, in some cases. In some cases, the display device 30 and/or the portable computing device 10 may establish a virtual private network (VPN) or other secure tunnel to a remote location over the data connection.

In this example, the portable computing device 10 accesses the Internet 60 using the data connection established by the display device 30. It also uses the display device 30 for display of data and for receipt of user input.

Figure 6:
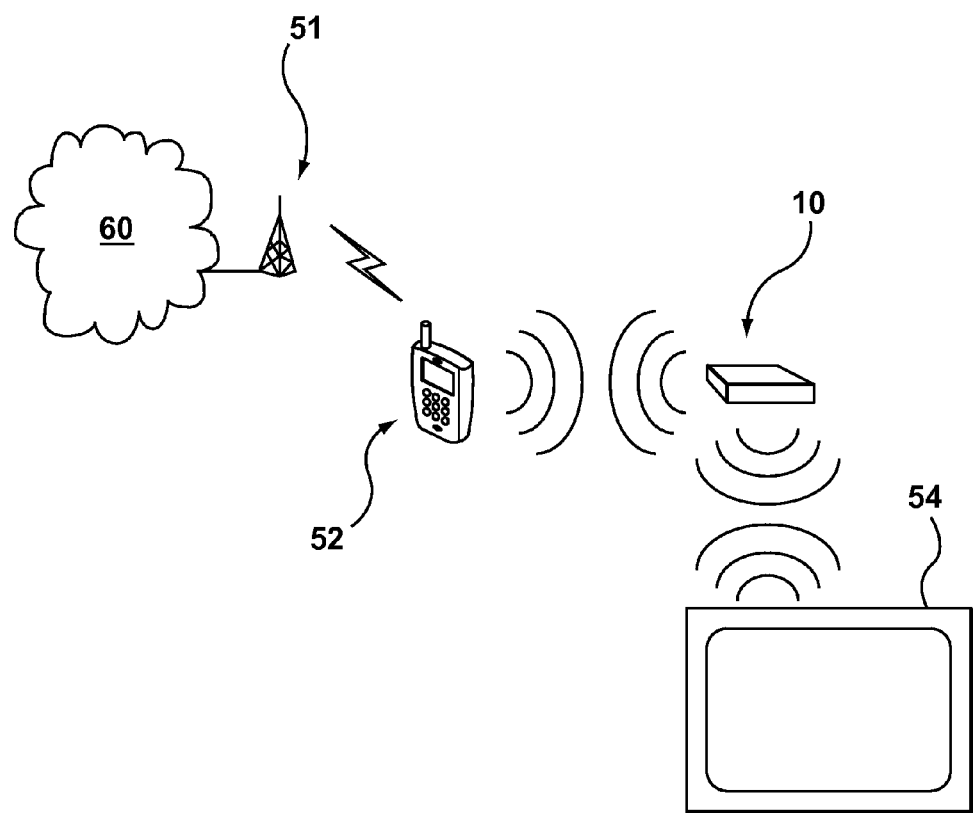

FIG. 6 shows yet another usage scenario. In this case, the portable computing device 10 connects wirelessly to a first peripheral device, such as a smartphone 52. The smartphone 52 has a data connection to the Internet 60, such as over a wireless wide area or cellular network 51. The portable computing device 10 is thus able to access the Internet 60 by using the connection established by the smartphone 52. A second peripheral device with display and input capabilities, such as a tablet 54, is also wirelessly connected to the portable computing device. The first and/or second peripheral devices may be smartphones, televisions, laptops, tablets, etc. The tablet 54 is used by the portable computing device 10 for display of data and receipt of user input.

The foregoing example usage scenarios provide example configurations in which the portable computing device 10 may leverage proximate external devices to gain display and user input capabilities. These configurations and scenarios are illustrative and are not exhaustive. It will be appreciated that the portable computing device 10 is dedicated to data processing/storage and application execution. This permits a user wearing the portable computing device 10 to carry with him or her all of the user's data and applications, including the user's preferred operating system and configurations, in a secure manner. Rather than duplicating the data and applications across various devices, the data and applications remain within the portable computing device 10 and the portable computing device 10 then provides the processing and program execution function for a variety of devices that the user may encounter and use, including smartphones, tablets, televisions, kiosks, terminals, laptops, desktops, etc.

In order to link to one or more of these devices, the portable computing device 10 is configured to accept and/or initiate wireless pairing with another device. For example, in the case of WiFi Direct, the portable computing device 10 may require user acceptance of a possible connection to an external device. The portable computing device 10 may include at least one user input mechanism, such as a button, touch-sensitive area, touchscreen, or the like, for receiving a pairing authorization input.

Various processes may be used to wirelessly pair the portable computing device 10 with an external device. In some embodiments in which the portable computing device 10 is equipped with a near-field-communication capabilities the devices may be paired through proximity. Additional acceptance inputs may be required for heightened security in authorizing a pairing. In some cases, the pairing process may conform to the Wi-Fi Protected Setup (WPS) standard, but not all embodiments. The WPS standard is known to have certain vulnerabilities that may be undesirable in the portable computing device 10 in some implementations.

Figure 7:
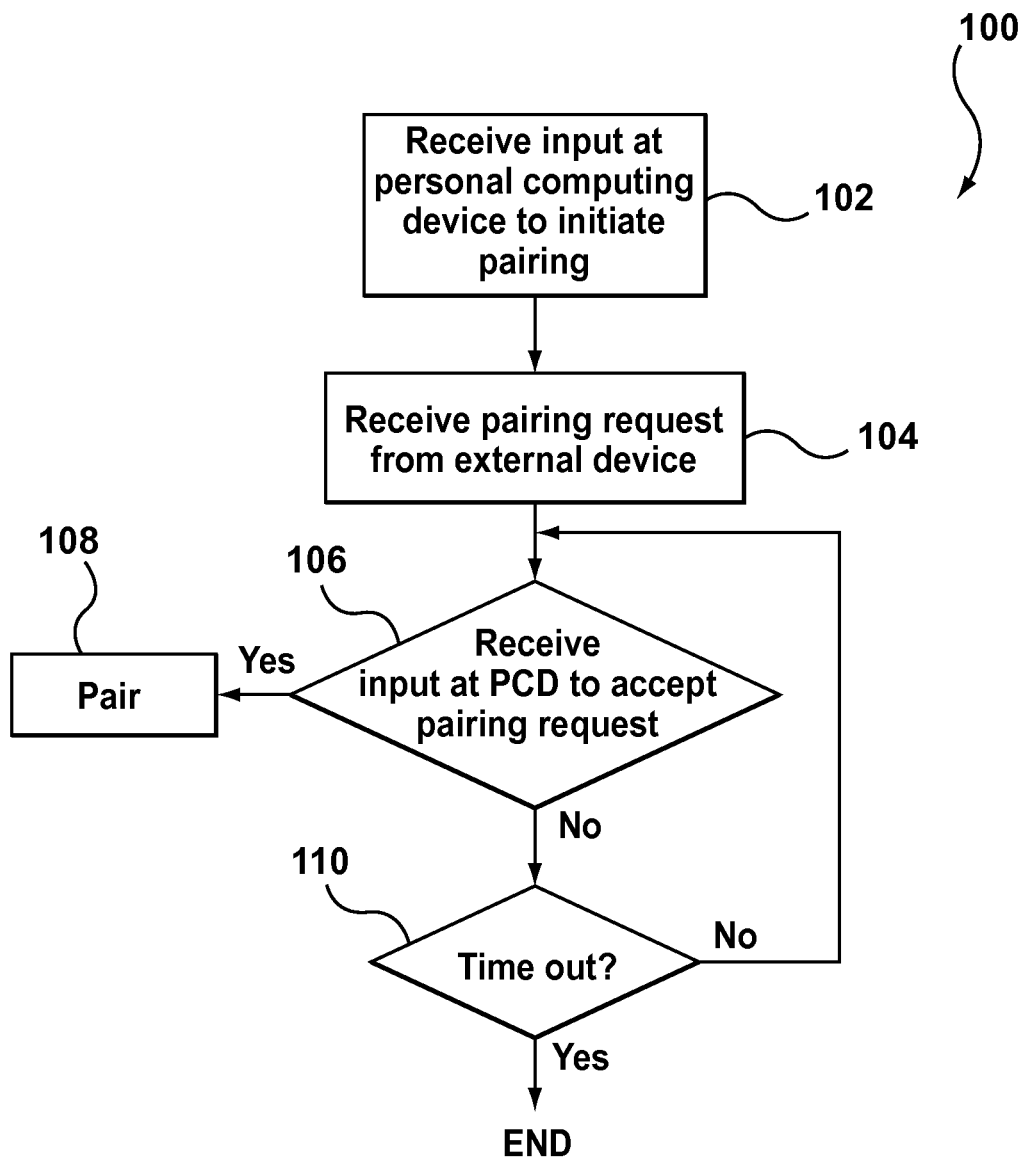
FIG. 7 shows, in flowchart form, an example method for pairing the portable computing device with an external device.

Reference is now made to FIG. 7, which shows, in flowchart form, one example method 100 for pairing the portable computing device with an external device. The portable computing device in this example features at least one input mechanism, which may include a button, switch, touch-sensitive area, etc.

In order to preserve battery life and prevent security attacks, the portable computing device in this example does not have its short-range communication subsystem constantly active and available for connections. For example, in the case of WiFi/WiFi Direct, the WiFi chip within the portable computing device is not necessarily active and not necessarily scanning for networks or broadcasting availability. In order to initiate pairing with an external device, the portable computing device awaits input of an initiate command through a user interface. Input of such a command may include pushing a button or other actuator, tapping or swiping a touch-sensitive area (e.g. if the touch-sensitive area is an annulus, a swiping motion around at least a portion of the ring may be detected as a pairing initiate command), or any other pre-defined gesture or action that is detectable using the limited input functionality of the portable computing device.

In operation 102, the portable computing device detects input of a pairing initiate command. In these examples, the input is not an input received wirelessly, but rather is an input through an input device on the portable computing device. This ensures that the command is initiated by a user of the portable computing device. In response, in operation 102, the portable computing device enables its short-range communication subsystem. The short-range communication subsystem is then able to send and receive wireless signals with nearby external devices. It will be appreciated that in some other embodiments the short-range communication subsystem may be enabled by default and not by receipt of a pairing initiate command, meaning that operation 102 may be omitted.

In operation 104, the portable computing device receives a pairing request via the short-range communication subsystem from an external device. In some embodiments, the request may indicate the device identity or type. For example, the request may indicate whether the device is a television, a laptop, a tablet, a smartphone, etc. In some embodiments, the request may include other details regarding the device, such an alphanumeric device name or other identifying details. The portable computing device has a limited display capability in most implementations, which may make it unfeasible to display full details regarding the request. If sufficient display capabilities are available in the portable computing device, then the name or other details of the external device may be displayed; however, if not, then only limited information or no information regarding the external device may be displayed. For example, an icon of the device type may be displayed or illuminated (e.g. if the icon is inlaid in a surface of the portable computing device). In some cases, the pairing request may be signaled to a user of the portable computing device through illumination of an LED or other such visual output, depending on the display output capabilities of the portable computing device. In at least some embodiments, the request from the external device may be send in reaction to an input by the user at the external device, e.g. the external device may receive a user input that causes it to send the pairing request.

In operation 106, the portable computing device evaluates whether it has received an input accepting the requested pairing. The input detected for accepting the requested pairing may be the same type of input as was earlier detected for initiating the pairing process in operation 102 (e.g. a button push, etc.), or it may be a different type of input, depending on the implementation. In operation 110, the portable computing device determines whether a timer has elapsed without detection of the acceptance input in operation 106. If so, then the request is refused. In some implementations, expiry of the time out may also result in expiry of the pairing process, such that the short-range communication subsystem is disabled until detection of another initiate command, such as in operation 102. In other implementations a different timer may be used to end the pairing process itself as opposed to expiring a requested pairing.

If an acceptance input is detected in operation 106, then the external device is paired with the portable computing device, as indicated by operation 108. Pairing, in this context, includes establishing a wireless link between the portable computing device and the external device through which data may be transmitted. In some cases, the link is secure, meaning that data transmitted over the link is encrypted. In some cases, the data sent over the link includes display data and/or audio data from the portable computing device to the external device based on one or more applications or processes executed on the processor of the portable computing device, and user input data and/or sensor data and/or network communications from the external device to the portable computing device.

Figure 8:
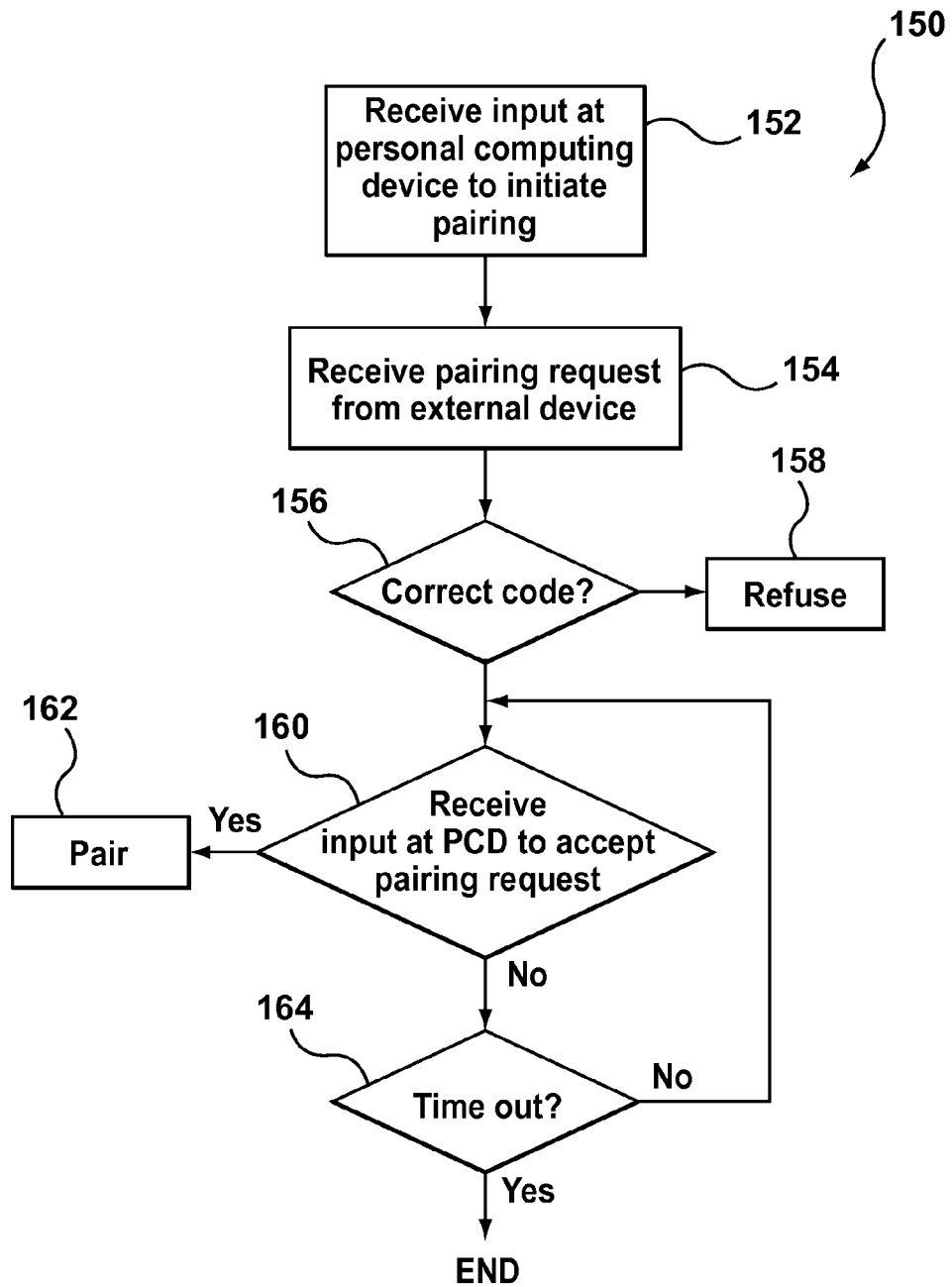
FIG. 8 shows, in flowchart form, another example method for pairing the portable computing device with an external device.

Reference is now made to FIG. 8, which shows another example method 150 for pairing the portable computing device with an external device. In this example method 150 the portable computing device again initiates the method 150 by detecting a pairing initiate command in operation 152 through a user interface mechanism on the portable computing device. In response, it enables its short-range communication subsystem to begin listening for pairing requests. As noted above, in some embodiments the short-range communication system may be enabled by default and not based on input of a pairing initiate command. In operation 154, it receives a pairing request from an external device.

In this example method 150, the external device provides an access code. The access code may be sent by the external device to the portable computing device in the pairing request or may be sent subsequently as part of a set of handshake communications. The external device obtains the access code by way of user input at the external device; for example, a user may be prompted to type in a PIN or password to enable pairing with the portable computing device. In some embodiments, the access code may be sent to the portable communication device in an encrypted form to prevent unauthorized disclosure of the access code.

In operation 156, the portable computing device evaluates whether the access code received in association with the pairing request is valid. If not, then in operation 158 it refuses the pairing request. If the access code is validated by the portable computing device, then the portable computing device outputs an indication that a pairing request has been received and awaits a user input indicating acceptance of the pairing request. As noted above in connection with FIG. 7, the indication that a pairing request has been received may include output of an LED signal, such as a flashing LED light, illumination or display of an icon indicating a pairing request, display of information detailing the type or name of the external device, or any other output regarding the pending pairing request, depending on the limited display capabilities of the portable computing device.

In operation 160, the portable computing device determines whether the pairing request has been accepted based on detection of a user input indicating acceptance. If so, then the external device and portable computing device are paired, as indicated by operation 162. If an associated timer expires without detection of the acceptance input, then the pairing request is refused, as indicated by operation 164.

As noted above, in some embodiments the portable computing device may have its short-range communication system enabled by default and scanning for external device pairing requests. Certain devices may be "white-listed", i.e. pre-authorized, in some embodiments, in order to speed the pairing of such devices with the portable computing device when they are in communication range. Certain types or categories of devices may be black-listed (e.g. automatically refused) or white-listed (e.g. automatically accepted) in some implementations. In one example a non-white-listed device is refused automatically unless the pairing process has been initiated by the portable computing device and/or direct contact between the devices is used to initiate the pairing.

In some embodiments, the pairing may be initiated based upon direct or near contact of the portable computing device and the external device. The pairing may be initiated through physical touch, as sensed by accelerometers or the like. In one example, a vibrator in one device may communicate vibratory signals through the casing of the device to the other device where those signals are detected by an accelerometer so as to ensure physical proximity when initiating pairing.

As will be appreciated, the pairing process may include the external device providing its characteristics, including capabilities and specifications (e.g. screen size/resolution), to the portable computing device.

In one configuration, the external device may have capabilities that are made available to the portable computing device only after an authorization process is completed. For example, the external device may be a retail kiosk or pay-for-use external device that requires validated payment information before its full functionality is made available to the portable computing device. In one such situation, during the pairing process the portable computer device may be prompted to provide payment information, such as mobile payment details, credit card details, debit card details, or the like. In some cases, the external device may solicit this information from the user through a user interface on the external device rather than via the portable computing device. Once the payment information has been obtained and validated by the external device, it makes its capabilities and functionality available to the portable computing device in accordance with whatever terms of use apply to the situation (e.g. for a limited rental time).

When pairing with an external device that requires a payment to accept certain terms of use, the portable computing device may present the option of accepting the payment and terms to the user via its limited display. The user may accept or decline the pairing by actuating a suitable input device on the portable computing device (e.g. press OK or CANCEL in a two-button embodiment). In some examples, the user may be permitted to renew or extend the rental period via the portable computing device when the portable computing device notifies the user that the rental period is about to expire.

Figure 14:
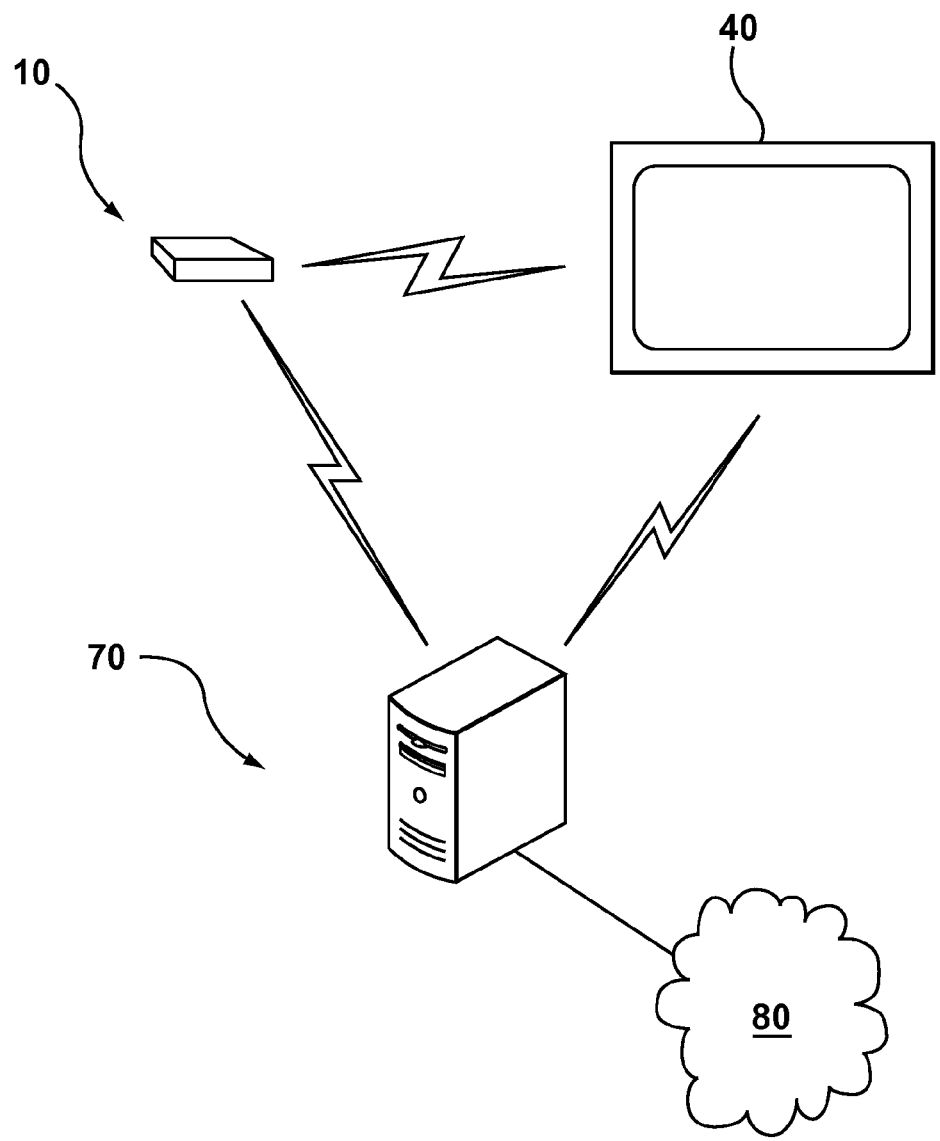
FIG. 14 diagrammatically shows another example usage scenario involving the portable computing device.

Reference is now made to FIG. 14, which shows a diagram of another example usage scenario involving the portable computing device 10. This usage scenario involves leveraging additional local processing resources to assist in managing processor-intensive activities, such as, for example, some complex games. In this example, the portable computing device 10 is paired with and wirelessly in communication with an external display device 40, such as a tablet or television/monitor, for display and other input/output in relation to the gaming application being executed by the portable computing device 10.

A local general purpose computer 70 with available processing resources may be leveraged by the portable computing device 10 and/or the external display device 40 to offload some computational/processing functions. The general purpose computer 70 may be made available for processing tasks and easily networked with the portable computing device 10 and/or external display device 40 using zero-config technology. The availability of the general purpose computer 70 may be an option presented to a user controlling the portable computing device 10, for example through display of a notification on the external display device 40. Via the external display device 40 or the portable computing device 10 the user may input authorization to use the general purpose computer 70 for processing. In some cases, the general purpose computer 70 may require receipt of a password or other authentication data. Once authorized, the determination to offload a particular processing task to the general purpose computer 70 may be made by the portable computing device 10.

In one example, the portable computing device 10 may delegate certain computational tasks to the general purpose computer 70. The general purpose computer 70 may receive instructions, code, parameters or other data to enable it to carry out the computation task and may send results data back to the portable computing device 10. In another example, the portable computing device 10 may offload certain display rendering or input/output computational tasks to the general purpose computer 70 with instructions to interact directly with the external display device 40. For example, the general purpose computer 70 may be tasked with rendering the view of a 3-D modeled game environment, perhaps together with processing/computing the changes thereto as a result of user input (i.e. gameplay).

Audio or video generated by the general purpose computer 70 may be streamed directly to the external display device 40 in some cases.

The general purpose computer 70 may be configured to accept or deny processing requests from the portable computing device 10 based, in one example, upon its currently available processing resources. The general purpose computer 70 may have a priority ranking of certain tasks and/or user devices to resolve conflicts in access to resources.

In some embodiments, the local area (room, building, etc.) may include a network 80 of general purpose computers. The network 80 may provide for load sharing and/or delegation of processing tasks amongst the computers. In this sense, any portable computing devices in the local area may all rely upon the network 80 of general purpose computers in order to offload demanding processing functions. Such as system allows for large availability of auxiliary processing power for individual user devices, such as the portable computing device 10, and may result in prolonged battery life in portable devices and reduced heat output.

Figure 9:
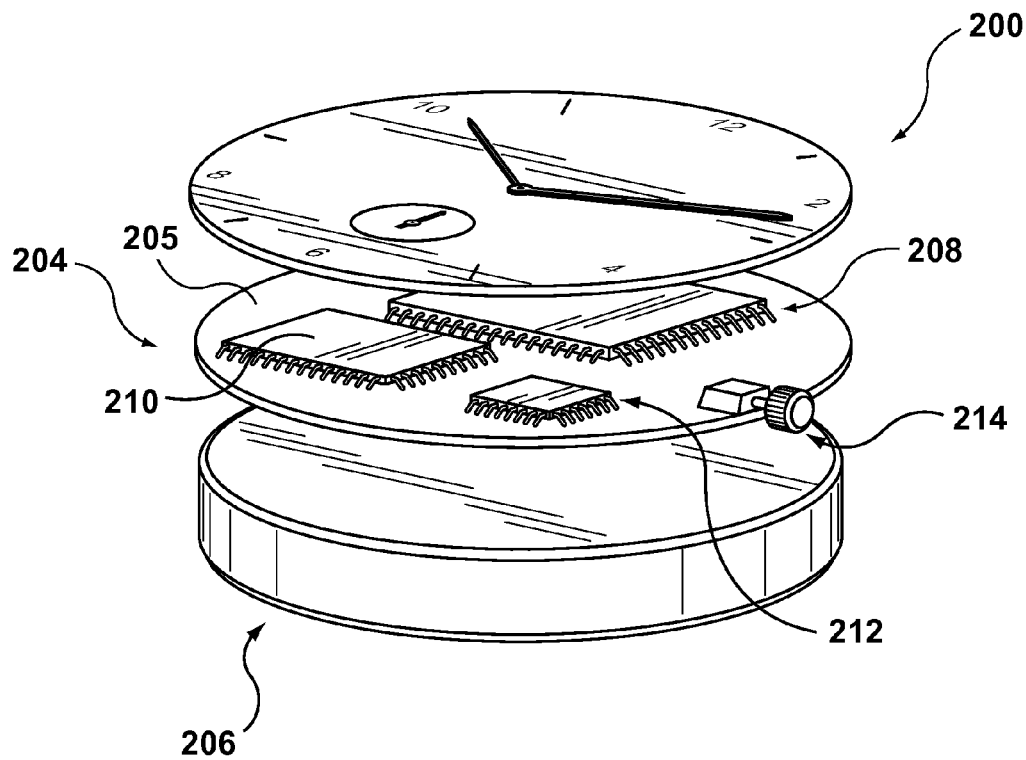
FIG. 9 shows an exploded perspective view of at least a portion of an example wristwatch according to the present application.

Reference is now made to FIG. 9, which shows an exploded perspective view of at least a portion of one example embodiment of a portable computing device in accordance with the present application. The portable computing device in this embodiment is a wristwatch 200. Not shown in the illustration are the casing for the components of the wristwatch 200 or any strap or band for securing the wristwatch 200 to a user's person.

The wristwatch 200 includes a watch face 202 for displaying the current time. In this example, the watch face 202 is an analog watch face having mechanical hands. In other examples, the watch face 202 may be electronic, using, for example an LED or LCD display to output the time in digital or analog (images of mechanical hands) format. The watch face 202 may include the components for keeping time. In the case of a mechanical watch, the watch face 202 may include, under its visible face plate, all mechanical structure such as the mainspring, tuning-fork, or other mechanical components. In the case of an electronic watch, the watch face 202 may be solely a display and face plate; although in one embodiment, the watch face 202 may include a stand-alone quartz crystal (or other electromechanical time source) and electrical components for tracking and displaying the time, rather than relying upon the electrical components described below.

The wristwatch 200 further includes digital circuitry 204 and a battery 206. The digital circuitry 204 includes a circuit board 205 with suitable interconnections and contact pads, one or more processors 208, memory 210, a short-range communication subsystem 212, and at least one input device, which in this case is illustrated as a navigation button 214. The button 214 may be depressible to select options (e.g. to accept a pairing request) and may also be rotatable to change features, such as to adjust the time/date, and/or select between available external devices for pairing.

The memory 210 may include flash memory, random access memory, or other types of volatile and non-volatile computer-readable storage devices. The processor 208 may include multiple cores and may be configured to execute stored program instructions, including program instructions that may be stored in memory 210. The stored program instructions may include an operating system, related modules/routines, and applications. The applications may include multi-media applications, messaging applications, productivity applications, games, or any other such applications. In some cases, the applications are integrated with the operating system. In other cases, the applications may be separate from the operating system and may be added to the wristwatch 200 subsequent to the installation of the operating system. The applications may include third-party applications downloaded from an application store or website that makes applications available for execution on the operating system of the wristwatch 200.

The short-range communication subsystem 212 may include a WiFi chip, a WiFi direct chip, a Bluetooth™ chip, or another chip implementing a different short-range communication protocol. In some embodiments (not illustrated), more than one short-range communication subsystem 212 may be present in the wristwatch 200.

The casing (not shown) may include suitable wiring to connect the battery 206 to the digital circuitry 204. The wristwatch 200, in some embodiments, includes an input port (not shown) and associated charging circuitry (not shown) for receiving a physical or wireless connection to a charging source for recharging the battery 206.

Figure 10:
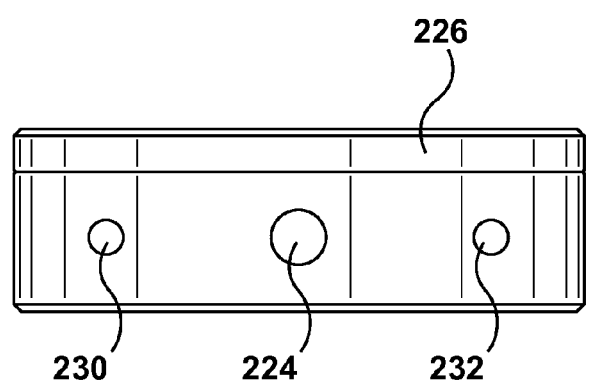
FIG. 10 shows a side view of another example wristwatch.

Reference is now made to FIG. 10, which shows a side view of one example embodiment of a wristwatch 220. The wristwatch 220 in this example includes a casing 222 and a watch face 226. Protruding through the casing is an actuator 224 for receiving user input. The actuator 224 may be a push button or the like. It will be appreciated that may embodiments may include two or more actuators, such as actuators 230 and 232, for signaling selections (YES/NO or OK/CANCEL) or menu navigation (UP/DOWN/SELECT or SELECT/NEXT). In some cases, the actuator may be one or more touch-sensitive surfaces, buttons, toggle switches, etc. In some implementations one or more of the actuators may by a "soft-key", meaning that its associated function/meaning is software-configurable.

In accordance with some embodiments, one or more of the actuators 224, 230, 232 may have a characteristic design and/or color to distinguish it from other actuators. For example, the shape of a button may be square, triangular, round, hexagonal, etc. In another example, each button may have a distinct color.

In this example, the casing 22 may also include one or more LED lights (not shown) for outputting visual signals. The LED lights may be used to communicate information to a user regarding the status or state of the processor or applications within the wristwatch 200. As an example, the LED lights may be used to indicate a low battery state, a charging state, a pairing request pending state, a paired state, a power on state, or any other such state information.

Figure 11:
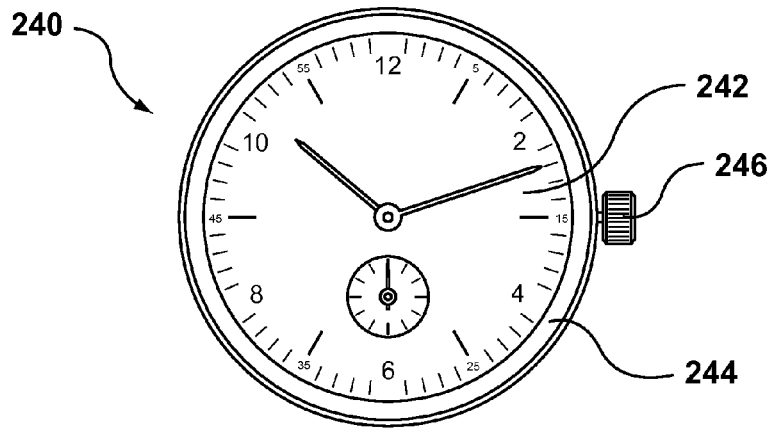
FIG. 11 shows a top view of the face of a further example wristwatch.

Reference is now made to FIG. 11, which shows a top view of another example wristwatch 240. In this example, the wristwatch 240 includes a watch face 242 that features analog time indicators, which may be driven by mechanical or electrical time sources. The time indicators themselves may be physically mechanical hands driven to rotate about an axis by the mechanical or electromechanical time keeping mechanism within the wristwatch, or they may be a display of an analog time indication. In the case where the time indicators are rendered on a display, the watch face 242 display may be touch-sensitive in some embodiments.

The wristwatch 240 includes a bezel 244 surrounding at least a portion of the watch face 242. The bezel 244 shown is annular and surrounds the watch face 242 in this example. The bezel 244, in this example, is touch sensitive. Accordingly, the bezel 244 is configured to function as an input device to the processing elements within the wristwatch 240. In some embodiments, the bezel 244 is also a display to communicate state information to a user.

Figure 12:
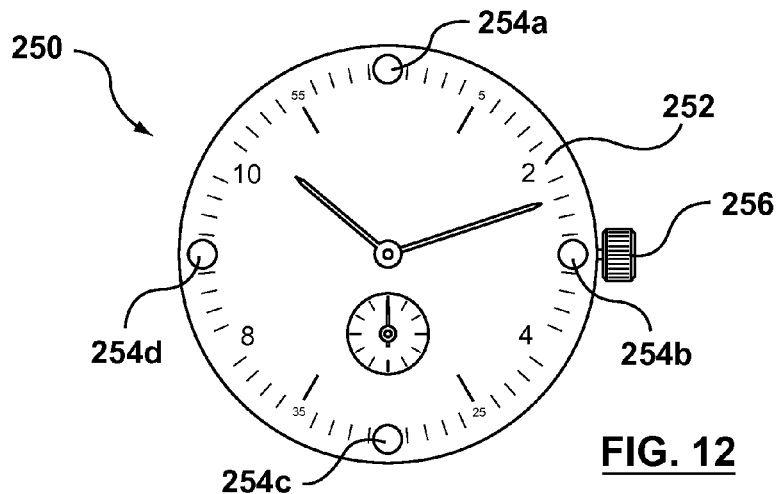
FIG. 12 shows a top view of the face of another example wristwatch.

Reference is now made to FIG. 12, which shows a top view of yet another example wristwatch 250. In this example, the wristwatch 250 includes a watch face 252, an input actuator 256, and a plurality of display elements inlaid within the watch face 252, which in this case are shown as LEDs 254 (shown individually as 254a, 254b, 254c, 254d). In some example embodiments, the watch face 252 cut-outs may have a design or icon applied such that one or more of the LEDs 254 illuminate the design or icon. In such a manner, each LED 254 may signal different information or status to a user.

Figure 13:
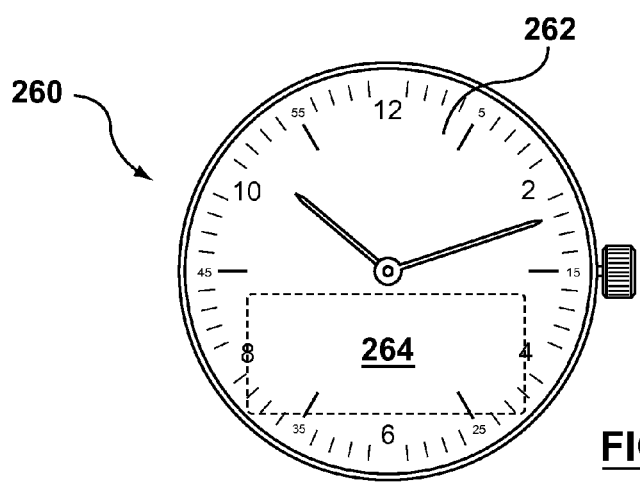
FIG. 13 shows a top view of the face of yet a further example wristwatch.

Reference is now made to FIG. 13, which shows a top view of a further example wristwatch 260. In this example, the wristwatch 260 includes a watch face 262 and at least a portion of the watch face 262 includes a display area 264. In some embodiments, the display area 264 may comprise the entire watch face 262. The display area 264 may include an LCD or LED display screen for rendering graphics and text. In some embodiments, the display area 264 may be touch sensitive so as to also function as an input device.

It will be understood that the processor within the portable computing device described herein and any module, routine, process, thread, or other software component implementing the described methods/processes may be realized using standard computer programming techniques and languages. The present disclosure is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A wristwatch to wirelessly connect to an external display device to view applications executed by the wristwatch, comprising:
   a wearable casing, containing
      a processor to provide a run-time environment for the execution of an application including generating a graphical user interface for the application,
      memory storing the application to be executed by the processor,
      a battery,
      an output interface insufficient for displaying the graphical user interface during execution of the application, and
      a short-range communication system to connect wirelessly to the external display device and transmit the graphical user interface from the processor to the external display device for display of the graphical user interface on the external display device and to concurrently wirelessly receive user input detected by an external device having one or more user input devices; and
   the wearable casing including a face plate having a time display.

2. The wristwatch claimed in claim 1, excluding a long-range communication system.

3. The wristwatch claimed in claim 2, wherein the long-range communication system comprises a cellular communication system.

4. The wristwatch claimed in claim 1, wherein the time display is an analog time display.

5. The wristwatch claimed in claim 4, wherein the face plate includes a mechanical time piece including mechanically movable hands.

6. The wristwatch claimed in claim 1, further comprising a local user input device.

7. The wristwatch claimed in claim 6, wherein the local user input device comprises a button and wherein the wristwatch excludes any touch-sensitive user input devices, voice-based user input devices, or motion-based user input devices.

8. The wristwatch claimed in claim 6, wherein the user input device comprises a touch-sensitive bezel.

9. The wristwatch claimed in claim 1, wherein the graphical user interface comprises a video.

10. The wristwatch claimed in claim 1, wherein the graphical user interface comprises a menu of selectable icons.

11. The wristwatch claimed in claim 1, wherein the graphical user interface comprises a game interface.

12. The wristwatch claimed in claim 1, wherein the application to be executed by the processor comprises a browser, and wherein the graphical user interface comprises a browser interface window.

13. A system for portable execution of applications, the system comprising:
   an external display device having a short-range wireless system for communication and a display screen;
   an external device having one or more user input devices; and
   a wearable portable computing device including,
      a processor to provide a run-time environment for the execution of an application including generating a graphical user interface for the application,
      memory storing one or more applications to be executed by the processor,
      a battery,
      an output interface insufficient for displaying the graphical user interface during execution of the application,
      a short-range communication system to connect wirelessly to the external display device and transmit the graphical user interface from the processor to the external display device for display of the graphical user interface on the external display device and to concurrently wirelessly receive user input detected by the external device having the one or more user input devices and
      wherein the wearable portable computing device excludes a smartphone, tablet, laptop, or e-reader.

14. The system claimed in claim 13, further comprising a general purpose computer connected wirelessly to the portable computing device, wherein the portable computing device is to offload a processing task for execution of the application to the general purpose computer, and wherein the general purpose computer is to transmit a result of the processing task to the wearable portable computing device.

15. The wristwatch claimed in claim 1, wherein the short-range communication system is to relay the received user input to the processor for run-time interaction with the application to be executed by the processor.

16. A wristwatch to wirelessly connect to an external display device to view and interact with applications executed by the wristwatch, the external display device having a display screen, a user input device and a short-range wireless system, the wristwatch consisting essentially of:

a wearable casing, containing
- a processor to provide a run-time environment for the execution of an application that generates a graphical user interface for real-time interaction with the application during run-time,
- memory storing the application to be executed by the processor,
- a battery,
- an output interface incapable of displaying the graphical user interface during execution of the application, and
- a short-range communication system to connect wirelessly to the external display device, to transmit the graphical user interface from the processor to the external display device for display of the graphical user interface on the external display device, and to receive user input data from the external display device obtained from its user input device; and the wearable casing including a face plate having a time display.

17. The wristwatch claimed in claim 1, wherein the external display device and the external device having said one or more user input devices are the same peripheral device.

18. The wristwatch claimed in claim 1, wherein the external display device and the external device having said one or more user input devices are separate peripheral devices.

19. The system claimed in claim 13, wherein the wearable portable computing device comprises a pendant or a wristwatch.

* * * * *